E. ANDREWS.
Circular Saws.

No. 156,748.  Patented Nov. 10, 1874.

Witnesses:—  Inventor:—

UNITED STATES PATENT OFFICE.

EMANUEL ANDREWS, OF WILLIAMSPORT, PENNSYLVANIA.

IMPROVEMENT IN CIRCULAR SAWS.

Specification forming part of Letters Patent No. 156,748, dated November 10, 1874; application filed May 4, 1874.

*To all whom it may concern:*

Be it known that I, EMANUEL ANDREWS, of Williamsport, in the county of Lycoming and State of Pennsylvania, have invented a new and useful Improvement in Circular Saws; and I do hereby declare that the following is a full and exact description of the same, reference being had to the accompanying drawings and to the letters of reference marked thereon.

The object I have in view in the construction of my circular saw is to make it cut with less applied power, or do more work with a given power; and my invention therein consists in arranging the teeth upon the periphery of the saw-plate in groups, in which the first tooth shall be the longest, and the succeeding teeth shall gradually diminish in space to the last one in the group; but all the teeth, whether longer or shorter, shall have the same depth radially.

To enable those skilled in the art to make and use my saw, I proceed to describe the same in connection with the drawings, in which—

Figure 1:
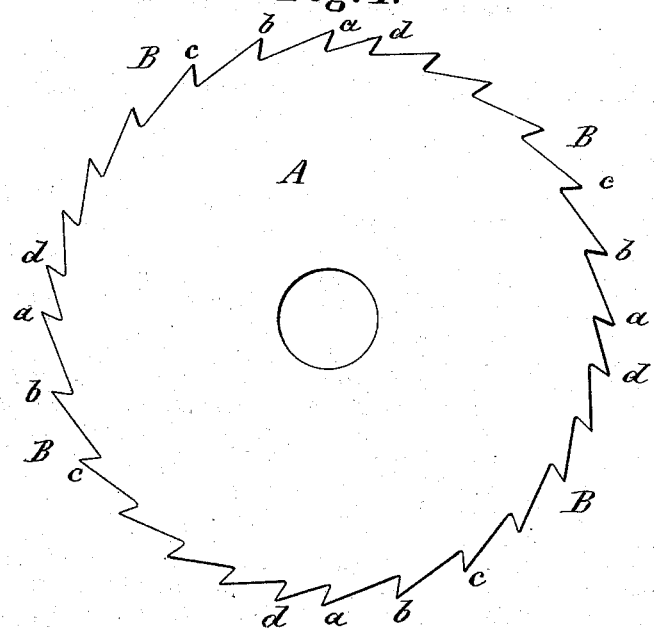
Figure 2:
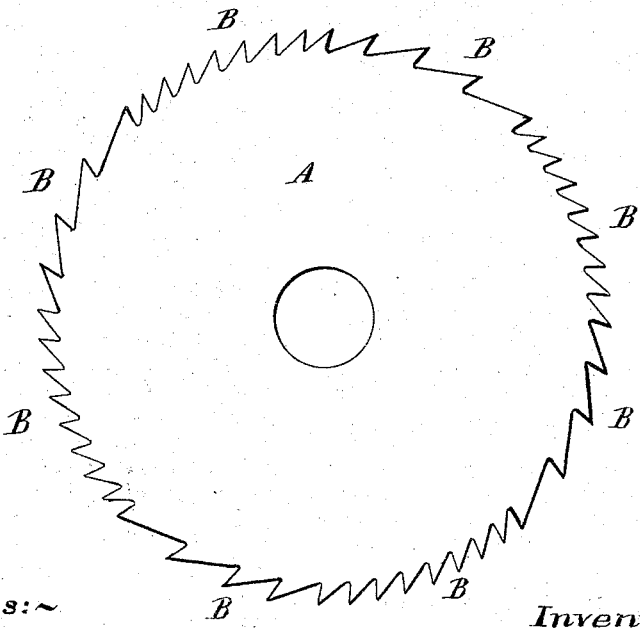

Figure 1 is a plan of my saw with four groups of teeth, and Fig 2 a plan of the same with eight groups of teeth.

Like letters denote similar parts in each figure.

A represents a circular saw having four groups of teeth, B. In each of these groups the first tooth, $a$, is longer than the second tooth, $b$, and that again longer than the third tooth, $c$, and so on to the last tooth, $d$, each tooth being a little less from point to point than the preceding one, by a regular order of diminution, the first tooth, $a$, being nearly double the length of the last tooth, $d$. All of these teeth, however, are of the same height, upon a vertical line, and of the same general form. Each group has the same number of teeth, each group occupies one fourth of the periphery of the saw-plate, and the saw is a perfect circle in a line drawn around the roots of the teeth or over their points.

In Fig. 2 is shown a saw having eight instead of four groups of teeth.

It is not doubted that, in some instances, six groups of teeth may be used, while in other cases as many as twelve groups, or even a greater number, may be used to advantage.

The operation of my saw is as follows, presuming it to be mounted in a mill, and employed in cutting logs into boards: Suppose the tooth $a$, in the revolution of the saw, to enter into the log, which is fed forward in the ordinary way, it is followed by the next tooth, $b$, at a certain interval, and then by the tooth $c$, at a less interval, and so on, with decreasing intervals, to the last tooth, $d$. Then comes the long tooth of the next group, and, in succession, the members of the same group in diminishing distances, and in like way, through all the groups, while the saw has made a complete revolution.

The feed of the log being uniform, it follows that the log advances the smallest distance before the tooth $a$ enters it, because the space between the points of the teeth $a$ and $d$ is the shortest, and, therefore, the tooth $a$ cuts but a little way into the log, and makes but fine sawdust. The tooth $b$, however, comes along with a large interval, during which the log has been fed forward a considerable distance, and this tooth cuts deeply and takes out very coarse sawdust. The next tooth, $c$, obviously does not cut quite so deeply as the tooth $b$ did, and each succeeding tooth will cut less and less deeply, until we get around to the tooth $a$, which cuts least of all.

One result of this construction is that the cutting of the saw being both coarse and fine, and the sawdust both coarse and fine, the saw is not so liable to catch and hang in the cut in sawing, and clears itself more readily.

Another effect of the grouping of these teeth of graduated length is that the saw revolves with a series of reliefs, or partial cessations from the resistance of the log, and requires less power to drive it.

Another result of the grouping of these teeth is that the same saw can be used effectively in sawing both soft and hard wood logs.

Having thus described and explained my invention, what I claim as new therein, and desire to secure by Letters Patent, is—

A circular saw having groups of teeth of equal depth, and of gradually-diminishing space, substantially as described and shown.

This specification signed and witnessed this 30th day of April, 1874.

EMANUEL ANDREWS.

Witnesses:
 CHARLES THURMAN,
 GEORGE L. DYER.